United States Patent

Usami et al.

[11] Patent Number: 6,091,536
[45] Date of Patent: Jul. 18, 2000

[54] OPTICAL PROCESSING DEVICE

[75] Inventors: Masashi Usami; Munefumi Tsurusawa; Yuichi Matsushima, all of Tokyo, Japan

[73] Assignee: KDD Corporation, Tokyo, Japan

[21] Appl. No.: 09/212,891

[22] Filed: Dec. 16, 1998

[30] Foreign Application Priority Data

Jan. 7, 1998 [JP] Japan .................................. 10-001464

[51] Int. Cl.⁷ .............................. G02F 1/03; G02F 1/295; G02B 26/00
[52] U.S. Cl. .......................... 359/244; 359/248; 359/241; 359/240; 359/237; 385/5
[58] Field of Search .................................. 359/248, 244, 359/237, 240, 241; 385/5

[56] References Cited

U.S. PATENT DOCUMENTS

| | | | |
|---|---|---|---|
| 4,626,075 | 12/1986 | Chemla | 350/354 |
| 5,119,227 | 6/1992 | Dawson | 359/244 |
| 5,805,327 | 9/1998 | Usami et al. | 359/244 |

*Primary Examiner*—Georgia Epps
*Assistant Examiner*—Adrianne Riviere
*Attorney, Agent, or Firm*—Christie, Parker & Hale, LLP

[57] ABSTRACT

An optical processor comprising, a semiconductor saturable absorber; a current source for injecting a current to the semiconductor saturable absorber; a signal light introducer for introducing a signal light to the saturable absorber; a control light introducer for introducing a control light having a wavelength not longer than the wavelength of the signal light into the semiconductor saturable absorber; an assist light introducer for introducing an assist light having a wavelength longer than the wavelength of the signal light into the semiconductor saturable absorber; and a signal light extractor for extracting the signal light after treatment by the semiconductor saturable absorber.

16 Claims, 12 Drawing Sheets

Fig. 7(1) Input signal light 14

Fig. 7(2) Control pulse light 16

Fig. 7(3) Assist light 22

Fig. 7(4) Output signal light 32 (with the assist light 22)

Fig. 7(5) Output signal light 32 (without the assist light 22 )

OPTICAL PROCESSING DEVICE

FIELD OF THE INVENTION

This invention relates to an optical processor, and more particularly, to an optical processor for gating of signal light, optical AND processing, demultiplexing of time division multiplexed signal light, optical modulation and wavelength conversion.

BACKGROUND OF THE INVENTION

Saturable absorption elements are capable of controlling transmittance or refractive index of signal light by irradiating or not irradiating control light, and are usable in optical gate switches, optical AND devices, demultiplexers (DMUX) of time division multiplexed signal, optical modulators, wavelength converters, and so forth. Hereinbelow, these devices are called optical gate switches, etc.

Absorption saturation effect of a semiconductor pertains to the nature that, when light of an energy just above a bandgap energy enters into the semiconductor, the absorptance (transmittance) non-linearly decreases (increases) as the incident light intensity increases, and it occurs due to the band filling effect where electron-hole pairs generated by absorption increase the state occupation factor within a band and the absorption end shifts toward a higher energy side. Normally, therefore, signal light does not pass through due to large absorption. However, when control light of an intensity over a certain value enters and causes absorption saturation of a saturable absorption element, the transmittance increases and permits the signal light to pass through. As a result, The saturable absorption element can be used as an optical gate switch, etc.

Changes in transmittance cause changes in refractive index according to the Kramas-Kronig relation. Therefore, saturable absorption elements are characterized in being variable in refractive index in response to the intensity of incident light. Since changes in refractive index causes the phase of the signal light to change, an optical gate switch, etc. having a function similar to the changes in absorptance can be realized by using interference of two optical paths.

Figure 12A:
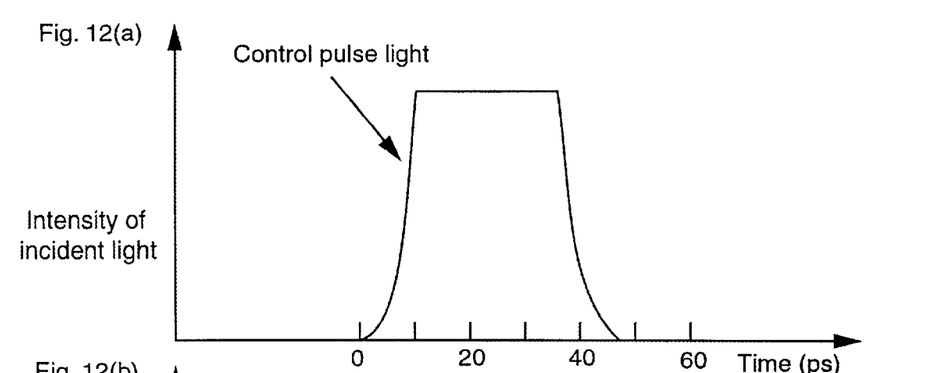
FIGS. 12(a) through 12(c) are diagrams showing changes in absorptance coefficient and refractive index of a saturable absorber element with time with respect to control pulse light.
Figure 12B:
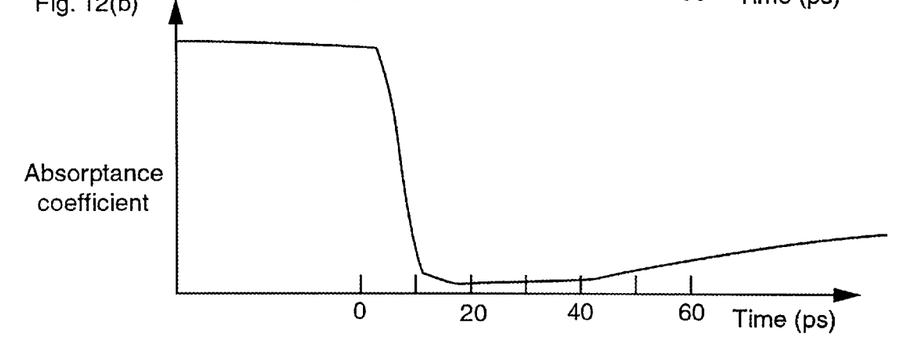
Figure 12C:
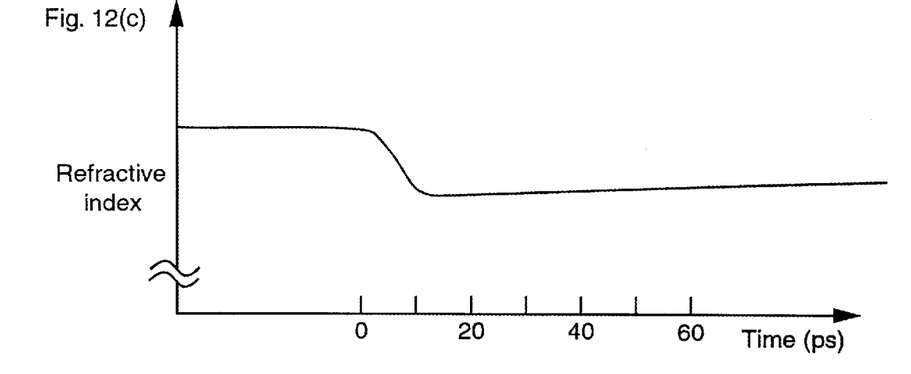

However, observing the changes in transmittance with time when control pulse light enters into a semiconductor saturable absorption element, although the absorptance decreases with a sufficiently quick response on the order of picoseconds at the rise of the control pulse light, the time required to the absorptance to return the original value after the fall of the control pulse light is as long as the lifetime of carriers (electrons and holes) approximately. This aspect is schematically shown in FIGS. 12(a) through 12(c) in which FIG. 12(a) shows changes in intensity of control pulse light with time, FIG. 12(b) shows changes in absorption coefficient of a saturable absorption element with time relative to signal light, and FIG. 12(c) shows changes in refractive index, putting time (ps) on the abscissa. As shown here, even when the control pulse light turns out OFF, it takes approximately 1 nanosecond for the absorption coefficient to recover. Since the absorptance recovery time is restricted by the so-called carrier lifetime, gating action could not follow fast-cyclic control pulse light as short as the carrier lifetime or less.

For the purpose of reducing the carrier lifetime of a semiconductor saturable absorption element, there was a proposal to introduce impurities or defects into the absorbing layer to shorten the carrier lifetime to sub-picoseconds. However, since the process of recombination is non-radiative recombination, and the energy by recombination is converted to a heat energy, it is not suitable for fast-cyclic repetition. Further proposals were also made, such as applying a reverse bias to remove carriers, removing carriers generated in the absorbing region by utilizing tunneling effect, but they could not realize quickness sufficiently responsive to optical pulses on the order of picoseconds.

As explained above, conventional saturable absorption elements had the drawbacks that, once they got into absorption saturation, the time required for the absorptance or refractive index to return the original value was limited by the carrier lifetime. Therefore, in a gate element using such a saturable absorption element directly, the gate action could not follow fast-cyclic control pulse light as short as the carrier lifetime or less.

SUMMARY OF THE INVENTION

It is therefore an object of the invention to provide an optical processor which is operative quickly and can follow faster-cyclic actions.

According to the invention, assist light of a wavelength longer than that of signal light is introduced into a semiconductor saturable absorber injected with a current in addition to the signal light and control light. Carriers increased by the control light get into radiative recombination due to induced emission by the assist light, and rapidly decreases. Therefore, the carrier lifetime can be reduced significantly, and the absorptance coefficient of the semiconductor saturable absorber can be recovered quickly. Since the recombination is radiative recombination which does not generate heat energy, fast-cyclic action is possible.

By selecting the wavelength of the signal light within the absorptive wavelength band of the semiconductor saturable absorber under the condition injected with the current, transmission of the signal light can be controlled by the control light.

By using a continuous wave as the assist light, carriers increased by the control light can be eliminated immediately. Further, by using light with a single wavelength as the assist light, stable action can be expected.

When the wavelength of the assist light is a wavelength transparent to the semiconductor saturable absorber under the condition injected with the current, the assist light is neutral relative to the semiconductor saturable absorber, and control characteristics by the control light can be adjusted easily.

When the semiconductor saturable absorber comprises a waveguide-type element, its connection to an optical fiber or other optical transmission medium is improved. When the semiconductor saturable absorber comprises a surface emitting element, its polarization dependency is fully suppressed, and stable processing characteristics are obtained.

In an arrangement where the signal light is divided and applied to two semiconductor saturable absorbers to multiplex their optical outputs, by applying the assist light to both semiconductor saturable absorbers and applying the control light to one of the semiconductor saturable absorbers, a MachZehnder interferometer can be realized.

BRIEF DESCRIPTION OF THE DRAWINGS

FIGS. 7(1) through 7(5) are diagrams showing waveforms for comparison of effects between the embodiment of the invention and the conventional device;

DESCRIPTION OF THE PREFERRED EMBODIMENTS

Embodiments of the invention are explained below in detail with reference to the drawings.

Figure 1:
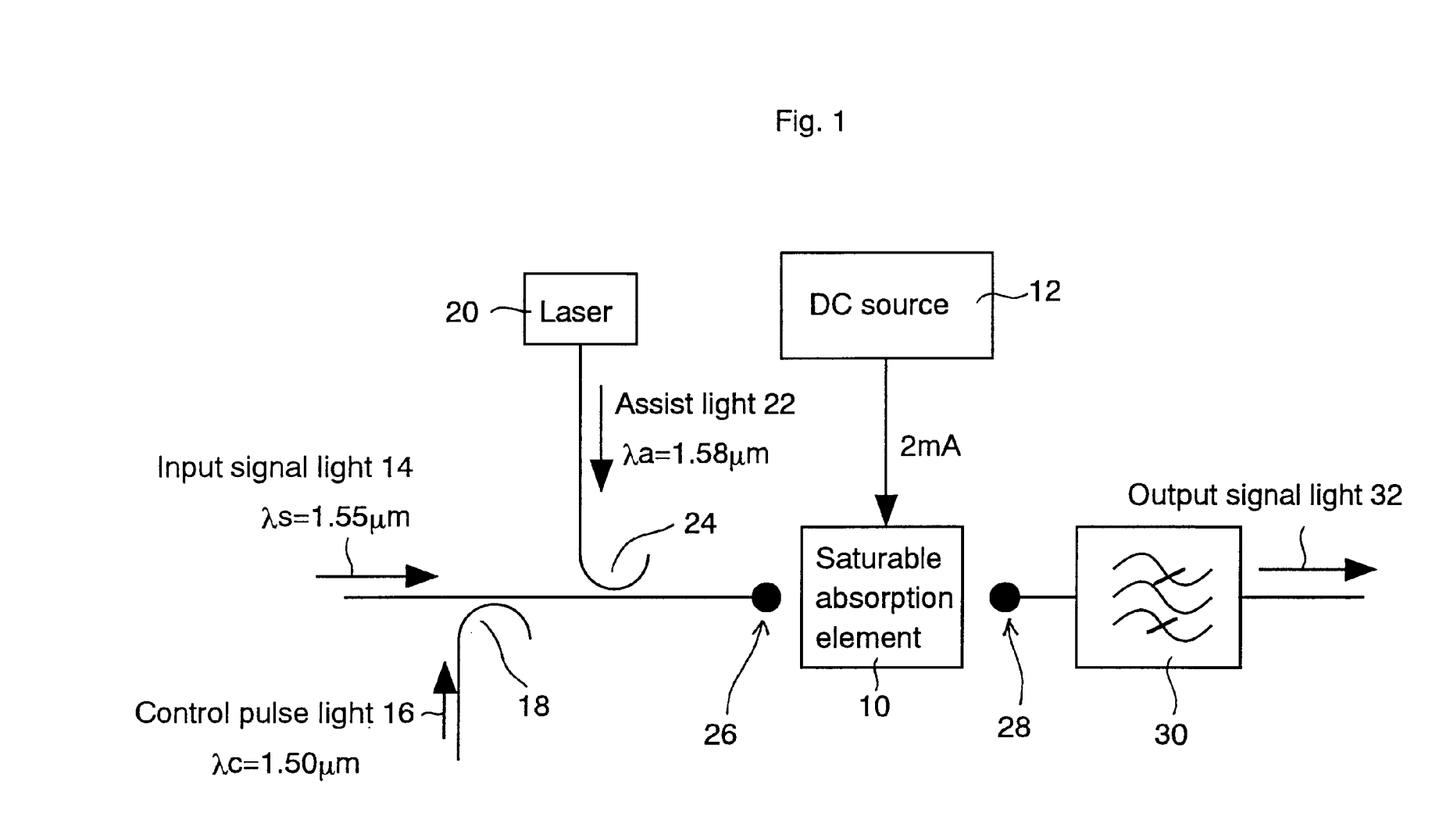
FIG. 1 is a schematic block diagram generally showing a first embodiment of the invention.

FIG. 1 is a schematic block diagram showing a general arrangement of the first embodiment of the invention. Numeral 10 denotes a waveguide-type semiconductor saturable absorption element of a multi-heterostructure in which an absorption layer having a band-gap energy width smaller than energies of signal light and control light is sandwiched by semiconductor layers having a band-gap energy width larger than that of the absorption layer, and a DC current is injected thereto from a DC source 12. Input signal light 14 and control pulse light 16 are multiplexed by an optical coupler 18, and CW assist light 22 output from a single-wavelength semiconductor laser 20 is further multiplexed by an optical coupler 24. The multiplexed light of the signal light 14, control light 16 and assist light 22 is introduced into the semiconductor saturable absorption element 10 from a hemispherical-ended fiber 26.

Although explained in detail later, the transmittance of the semiconductor saturable absorption element 10 relative to the signal light 14 acutely changes in response to the intensity of the control light 16 under the assist light 22, and can gate the signal light 14 at a high speed.

Output light from the semiconductor saturable absorption element 10 couples to optical fibers at a hemispherical-ended fiber 28, and enters into an optical band pass filter 30. Since the output light from the semiconductor saturable absorption element 10 contains three components of light having different wavelengths, namely, the signal light 14, control light 16 and assist light 22, the optical band pass filter 30 extracts only the wavelength of the signal light 14. That is, the optical band pass filter 30 is configured to pass only the wavelength of the signal light 14, and output light from the optical band pass filter 30 is the output signal light 32 which is the input signal light 14 gated by the control light 16.

In the embodiment shown here, the saturable absorption element 10 comprises a waveguide-type element including an absorption layer formed with a multi-quantum well of ten layers of InGaAs/InGaAsP whose absorption end wavelength is 1.59 μm, and the length of the element is 70 μm. Its both end surfaces are coated with an anti-reflection film. The input signal light 14 is an RZ signal having the wavelength of 1.55 μm and the bit rate of 10 Gbps. The wavelength of the control light 16 is 1.50 μm. The DC current applied from the DC source 12 to the saturable absorption element 10 is 2 mA. When the current of 2 mA is applied, the transparent wavelength of the saturable absorption element 10 is 1.58 μm. Although the wavelength of the assist light 22 is set to the transparent wavelength, 1.58 μm, it is not limited to it, and may be any wavelength longer than that of the signal light 14.

By introducing not only the signal light 14 and the control light 16 but also the assist light 22 of the transparent wavelength to the saturable absorption element 10, the absorption recovery time of the saturable absorption element 10 can be reduced significantly, and the saturable absorption element 10 can be activated at a high speed. Additionally, the saturable absorption element 10 does not generate heat unlike the conventional device, and therefore enables fast-cyclic repetition.

The principle of the operation of this embodiment is explained below. FIGS. 2(a) through 2(c) show absorption characteristics and changes in refractive index of the saturable absorption element 10 when assist light 22 having a longer wavelength than both wavelengths of the control pulse light 16 and the signal light 14 is applied together with the control pulse light 16. FIG. 2(a) shows changes in intensities of the control pulse light 6 and the assist light 22 with time. FIG. 2(b) shows changes in absorption coefficient of the saturable absorption element 10 relative to the signal light 14 with time. FIG. 2(c) shows changes in refractive index of the saturable absorption element 10 relative to the signal light 14 with time. Their abscissas shows time (ps).

It is known from FIGS. 2(a) through 2(c) that, when the assist light 22 is introduced, the absorption coefficient of the signal light rapidly increases at the fall of the control pulse light 16. A responsive speed equivalent to that at the rise of the control pulse light 16 is realized.

Gain/loss spectra of the semiconductor saturable absorption element 10 at t1, t2, t3 and t4 of FIGS. 2(a) through 2(c) are shown in FIGS. 3, 4, 5 and 6, respectively. The control light 16, signal light 14 and assist light 22 are longer in wavelength in this order. The same applies also when the control light 16 and the signal light 14 are equal in wavelength. At t1 of FIGS. 2(a) through 2(c) (FIG. 3), the control pulse light 16 does not enter yet (steady state). At t2 (FIG. 4), the control pulse light 16 enters. At t3 (FIG. 5), the control pulse light 16 has just fallen. At t4 (FIG. 6), the absorptance has been recovered.

Figure 3:
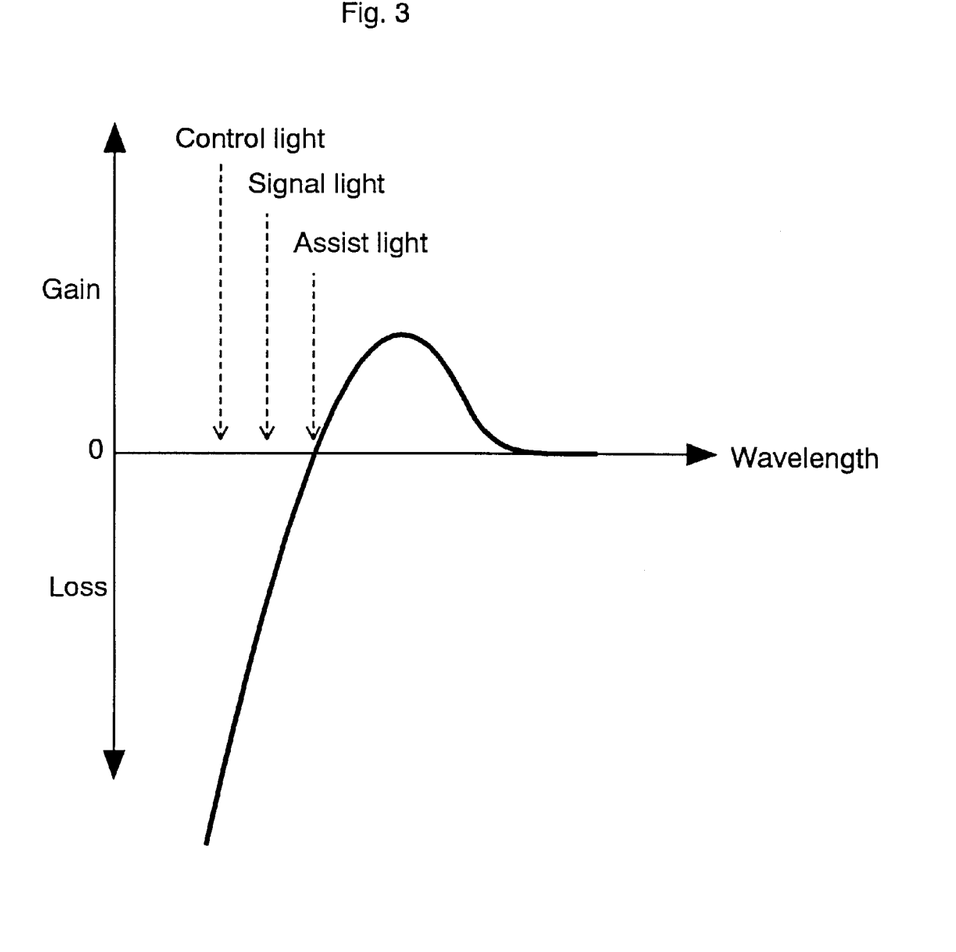
FIG. 3 is a diagram showing a gain spectrum of the semiconductor saturable absorption element 10 at t1 in FIG. 2.

FIG. 3 shows the gain spectrum of the semiconductor saturable absorption element 10 under the steady state where only a DC current is applied from the DC source 12. The wavelength of the assist light 22 is set to a wavelength (transparent wavelength) such that the gain (loss) becomes zero under application of the DC current. Therefore, under the steady state, neither absorption nor amplification occurs even when the assist light 22 is applied to the semiconductor saturable absorption element 10, and the presence or absence of the assist light 22 does not change the gain spectrum. It is necessary for the signal light to be sufficiently absorbed under the steady state in order to realize the optical gate function, etc. Therefore, the wavelength of the signal light must be in the range satisfying the condition (namely, in the range of shorter wavelengths than the transparent wavelength).

Figure 2:
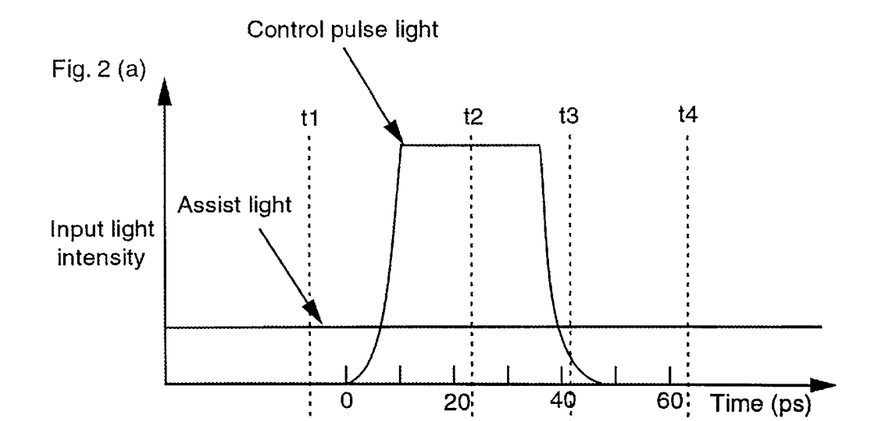
FIGS. 2(a) through 2(c) are diagrams showing changes in absorptance coefficient and refractive index of a semiconductor saturable absorption element 10 in the same embodiment.
Figure 4:
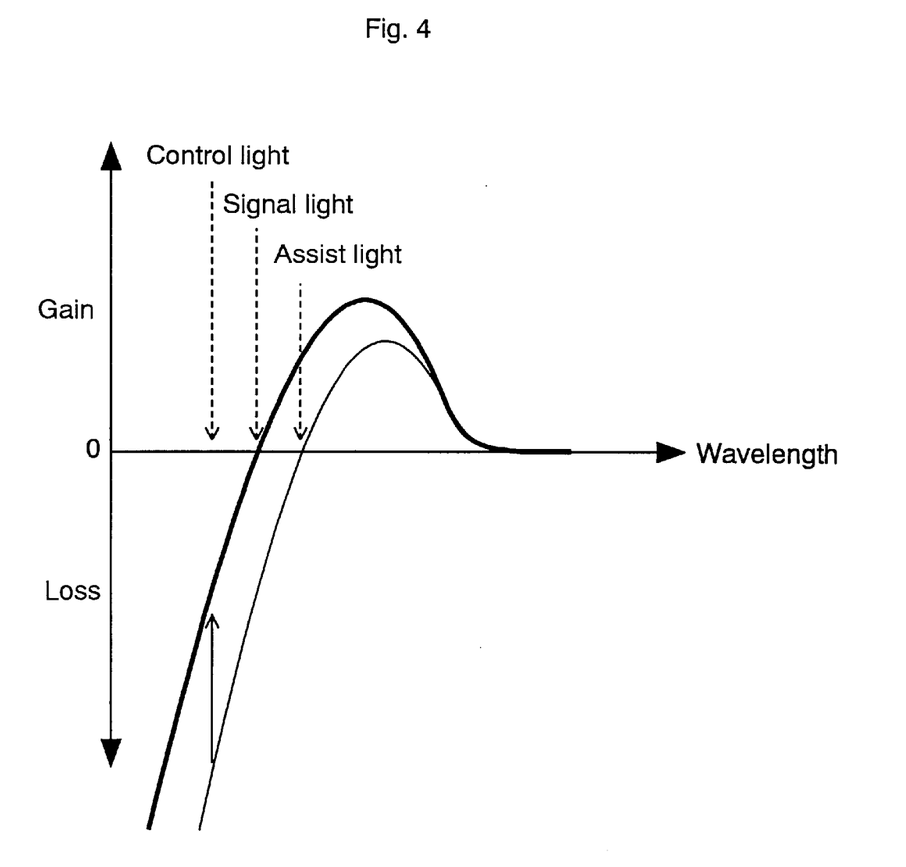
FIG. 4 is a diagram showing a gain spectrum of the semiconductor saturable absorption element 10 at t2 in FIG. 2.

Upon entry of the control pulse light 16 (t2 of FIGS. 2(*a*) through 2(*c*)), the carrier density in the semiconductor saturable absorption element 10 increases as shown in FIG. 4 due to absorption of the control pulse light 16. As a result, the absorption coefficient for the signal light 14 suddenly decreases (FIG. 2(*b*)), and also results in decreasing the refractive index (FIG. 2(*c*)).

Figure 5:
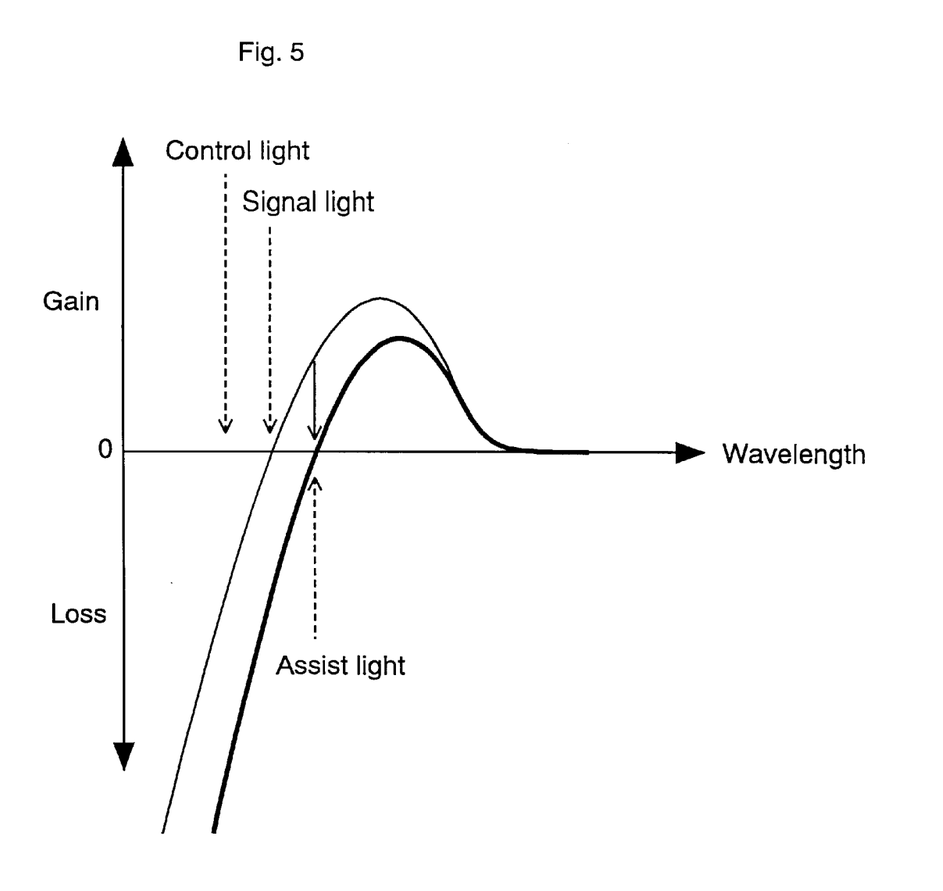
FIG. 5 is a diagram showing a gain spectrum of the semiconductor saturable absorption element 10 at t3 in FIG. 2.
Figure 6:
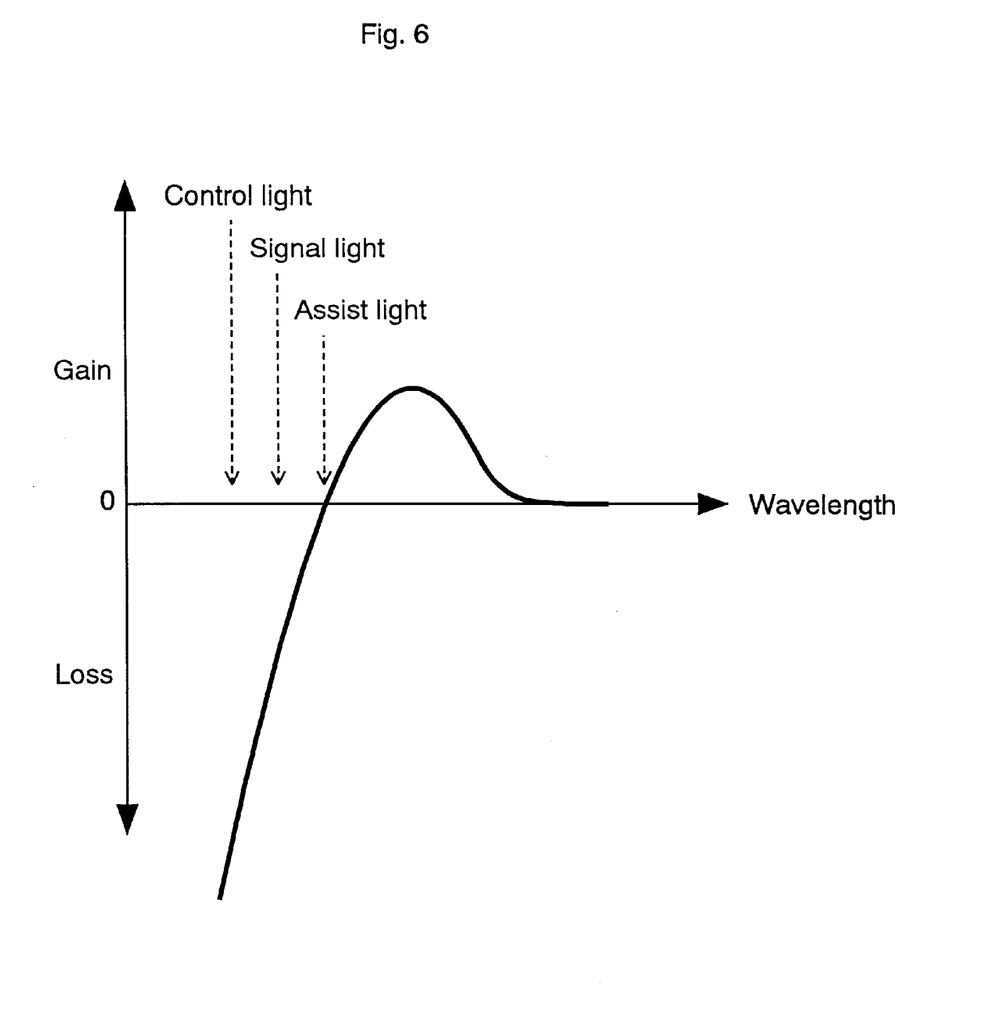
FIG. 6 is a diagram showing a gain spectrum of the semiconductor saturable absorption element 10 at t4 in FIG. 2.
Figure 7:
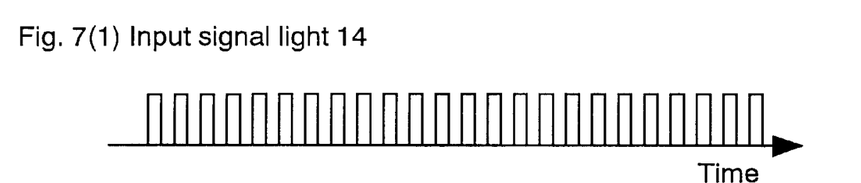

Just after the control pulse light 16 does not enter (t3 of FIGS. 2(*a*) through 2(*c*)), the carrier density of the semiconductor saturable absorption element 10 remains high as shown in FIG. 5, and the absorption coefficient and the refractive index relative to the signal light remain low (FIGS. 2(*b*) and 2(*c*)). However, in this status, a gain is produced for the assist light 22, stimulated emission occurs. As a result, the decrease of the carrier density is promoted, and the steady state is recovered soon as shown in FIG. 6.

In this manner, the saturable absorption element 10 according to the embodiment shown here can quickly recover its absorption coefficient due to stimulated emission by the assist light 22. Since recombination is radiative recombination without generation of heat energy, fast-cyclic motion is also possible.

The time required for a saturable absorption element to recover its original absorptance from the absorption saturation state is limited by the carrier lifetime (on the order of 1 nanosecond) determined by the material and the structure. In this embodiment, by additionally using the assist light 22, the carrier lifetime itself is shortened. Therefore, the embodiment can realize quick and fast-cyclic optical processing such as optical gating, etc. For example, optical gating, optical AND operation, demultiplexing of a time division multiplexed signal, optical modulation and wavelength conversion can be executed at a high speed and at a fast-cyclic frequency.

In order to define differences from the conventional device, the wavelength of the assist light 22 is determined to be the same as the transparent wavelength realized by injection of a current. Basically, however, it is sufficient for the assist light 22 to be longer in wavelength than the signal light 14, and the same effects are obtained even when it falls in the gain region or the loss region under the steady state. When the wavelength of the assist light 22 is a value within the loss region under the steady state, the assist light is always absorbed. When the wavelength of the assist light is a value within the gain region under the steady state, the assist light is always amplified. Although the embodiment has been explained as using a continuous wave as the assist light, it will be apparent that the same effects be obtained even with any pulse light synchronous with the signal light.

FIGS. 7(4) and 7(5) show waveforms of output signal light 32 with or without the assist light 22. FIG. 7(1) shows the input signal light 14, FIG. 7(2) shows the control pulse light 16, FIG. 7(3) shows the assist light 22, FIG. 7(4) shows the output signal light 32 in the presence of the assist light 22, and FIG. 7(5) shows the output signal light 32 without the assist light 22, taking time along the abscissa and optical intensity along the ordinate. The signal light 14 used here is RZ pulses of 20 Gbps. When the assist light 22 is used, the absorptance recovery time is reduced significantly. Therefore, the output signal light 32 comprises a pulse train extracted from the input signal light 14 by the control light 16 as shown in FIG. 7(4). When the assist light 22 is not used, part of the input signal light 14 passes through as shown in FIG. 7(5), and complete gating is not attained because there occurs a time lag in recovery of the absorptance even when the control pulse light 16 is turned off.

In this manner, the embodiment shown here realizes a fast-cyclic gate switch per bit for a high-speed optical signal on the order of 10 Gbps.

Figure 8:
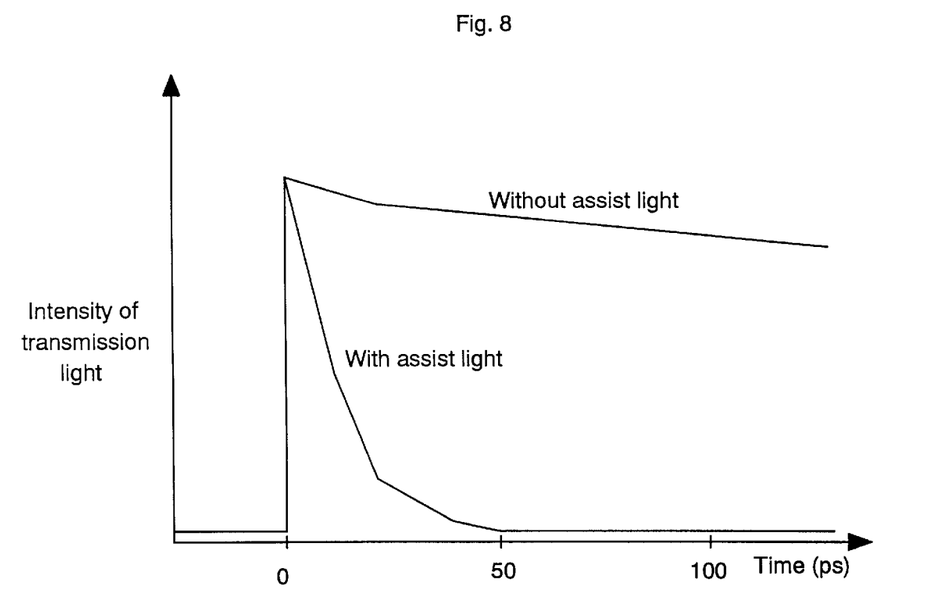
FIG. 8 is a diagram showing changes in optical transmission intensity of signal light with and without assist light.

Under the condition where the assist light is applied to the semiconductor saturable absorption element, changes with time in intensity (absorption coefficient) of light passing through the saturable absorption element were measured by pump/probe measurement by optical pulses with the wavelength of 1.50 $\mu$m and the pulse width of 100 fs (1 fs is $10^{-15}$ second). FIG. 8 shows changes with time in measured intensity of transmission light (absorption coefficient), taking the intensity of transmission light along the ordinate and time along the abscissa. A current of 2 mA is applied to the semiconductor saturable absorption element, and the wavelength of the assist light is 1.56 $\mu$m. While the absorptance recovery time was on the order of 1 nanosecond under no assist light irradiated, it was reduced to 20 ps when the assist light was irradiated.

In this manner, the saturable absorption element 10 according to the embodiment requires only 20 picoseconds, approximately, for recovery of the absorptance, and quick and fast-cyclic arbitrary optical gate switching action is promised. For example, if the signal light and the control light are introduced in synchronism bit by bit, then the element operates as an optical AND circuit. If the bit rate of the control light equals to one over an integer of the bit rate of the signal light, then the time division multiplexed signal can be demultiplexed. If continuous light is used as the signal light, optical modulation by the control light can be realized.

The embodiment shown above uses fiber-type optical couplers 18, 24 to multiplex the signal light 14, control pulse light 16 and the assist light 22. Apparently, however, other multiplexers, such as space coupling systems or arrayed waveguide multiplexers, can be used. Similarly, the hemispherical-ended fibers 26, 28 used in the embodiment for coupling to the semiconductor saturable absorption element 10 may be replaced with other optical elements such as lenses.

When CW light is used as the input signal light 14, wavelength converting function or optically modulating function can be realized. That is, the output signal light 32 is the signal light 14 coded according to the control pulse light 16, and it exhibits a waveform made by overlapping the control pulse light 16 (wavelength $\lambda c=1.50$ $\mu$m) on the input signal light 14 (wavelength $\lambda s=1.55$ $\mu$m). This is the wavelength converting function from the control pulse light 16 into the signal light 14, and can be regarded as optically modulating function by the control pulse light 16.

Figure 9:
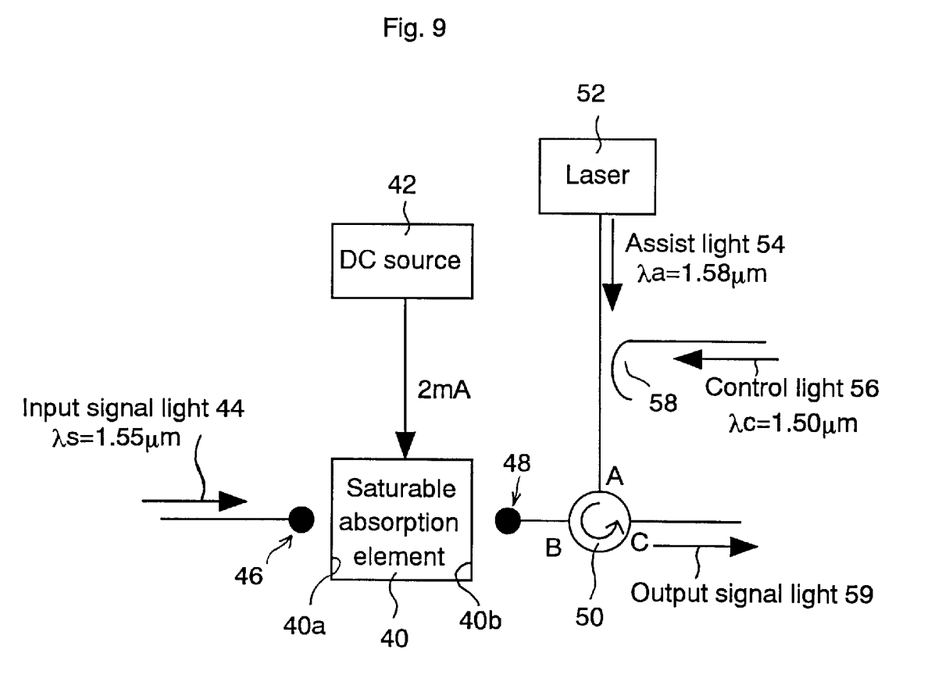
FIG. 9 is a schematic block diagram generally showing a second embodiment of the invention.

In the embodiment shown in FIG. 1, the input signal light 14, control pulse light 16 and assist light 22 propagate in the same direction within the saturable absorption element 10; however, the control pulse light and/or the assist light may propagate in the opposite direction relative to the signal light within the saturable absorption element. FIG. 9 is a block diagram generally showing a modified embodiment of the invention in which the control pulse light and the assist light propagate in the opposite direction from relative to the signal light within the saturable absorption element. The embodiment shown in FIG. 9 functions as an optical pulse waveform reshaping device.

In FIG. 9, numeral 40 denotes a semiconductor saturable absorption element similar to the semiconductor saturable absorption element 10, and a DC current is introduced from a DC source 42. Similarly to the embodiment shown in FIG. 1, the DC source 42 applies a current of approximately 2 mA to the semiconductor saturable absorption element 40. Input signal light (wavelength $\lambda s=1.55$ μm) 44 enters into an end surface 40a of the semiconductor saturable absorption element 40 through a hemispherical-ended fiber 46.

A hemispherical-ended fiber 48 is placed on the side of the end facet 40b of the semiconductor saturable absorption element 40, and it is connected to a port B of an optical circulator 50. The optical circulator 50 is an optical element configured to release light input through a port A from the port B and to release light input through the port B from a port C. Light made by multiplexing assist light (wavelength $\lambda a=1.58$ μm) 54 output from a single-wavelength semiconductor laser 52 and control light 56 (wavelength $\lambda c=1.50$ μm) by an optical fiber coupler 58 enters through the port A of the optical circulator 50. That is, the assist light 54 and the control light 56 enter into the port A of the optical circulator 50, and they are output from the port B.

The assist light 54 and the control light 56 output from the port B of the optical circulator 50 enter into the semiconductor saturable absorption element 48 through the hemispherical-ended fiber 48. Within the semiconductor saturable absorption element 48, therefore, the signal light 44 propagates from left to right on the sheet of FIG. 9 whereas the assist light 54 and the control light 56 propagate from right to left on the sheet of FIG. 9 oppositely from the signal light 44. Although the propagating direction of the assist light 54 and the control light 56 is different from the propagating direction of the signal light 44, the transmittance for the signal light 44 changes due to the same process as the embodiment shown in FIG. 1, and the signal light 44 is processed in the same manner as the signal light 14.

The signal light 44 processed in the semiconductor saturable absorption element exits from the end facet 40b, and enters into the port B of the optical circulator 50 through the hemispherical-ended fiber 48. The optical circulator 50 releases incident light through the port B from the port C. As a result, only the signal light 44 processed in the semiconductor saturable absorption element 40 is output as output signal light 59 from the port C of the optical circulator 50. The embodiment shown here needs no optical filter corresponding to the optical band pass filter 30.

Figure 10:
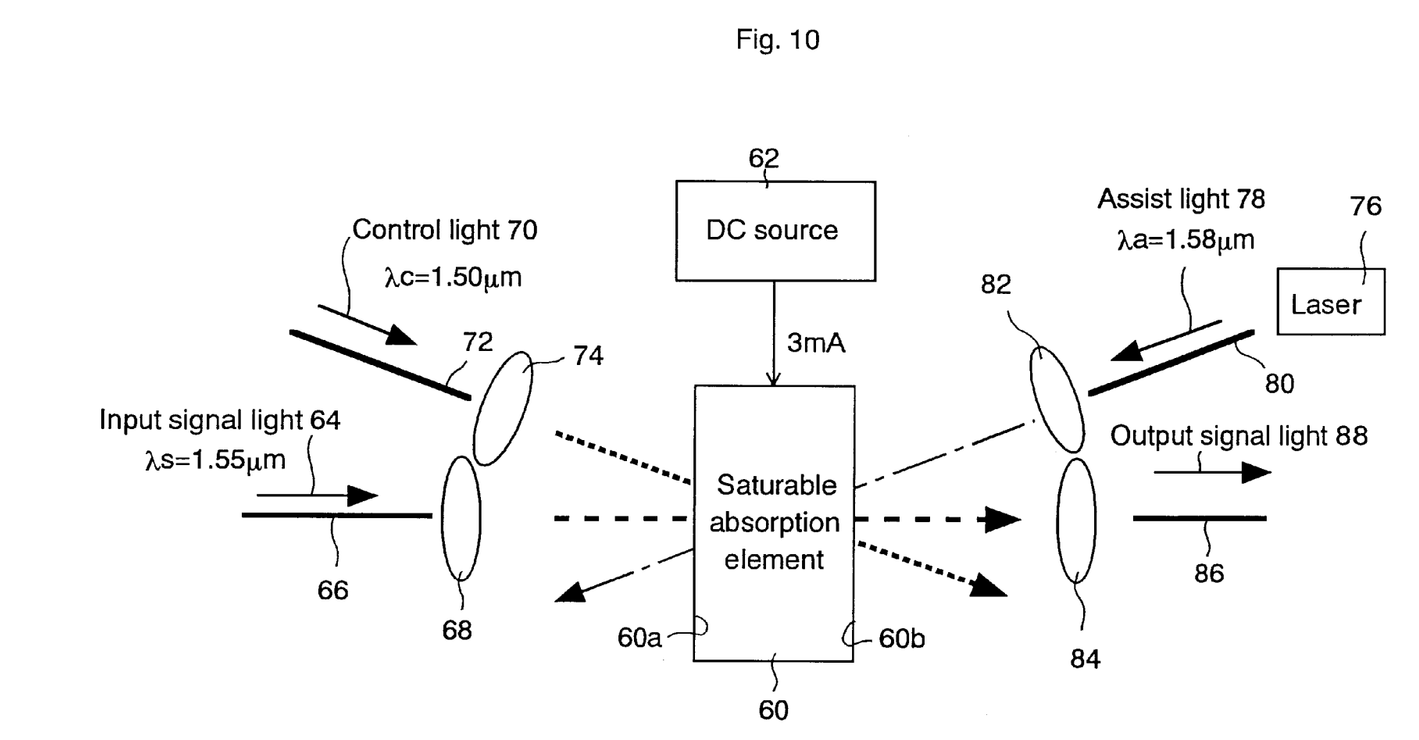
FIG. 10 is a schematic block diagram generally showing a third embodiment of the invention.

FIG. 10 is a schematic block diagram generally showing a third embodiment of the invention. The semiconductor saturable absorption element 60 according to the embodiment has a surface structure, and its absorption layer has a multi-quantum well structure of thirty layers of InGaAs/InGaAsP. Both end facets of the saturable absorption element 60 are coated with an anti-reflection film. A DC current of 3 mA is applied to the saturable absorption element 60 from a DC source 62. Thus, the transparent wavelength of the saturable absorption element 60 becomes 1.58 μm.

Signal light (wavelength $\lambda s=1.55$ μm) 64 propagates through an optical fiber 66, and it is introduced normally to one end surface 60a of the saturable absorption element 60 by a collective lens 68. Control light 70 propagates through an optical fiber 72, and it is introduced by a collective lens 74 to the end surface 60a of the saturable absorption element 60 from an angle slightly offset from the normal direction. A single-wavelength semiconductor laser 76 generates assist light 78 whose wavelength $\lambda a=1.58$ μm. The assist light 78 propagates through an optical fiber 80, and it is introduced by a collective lens 82 to the other end surface 60b of the saturable absorption element 60 from an angle slightly offset from the normal direction.

In the embodiment shown here, in order to prevent interference among the signal light 64, control light 70 and assist light 78, the signal light 64 is introduced from the normal direction to the saturable absorption element 60 whereas the control light 70 and the assist light 78 are introduced from angled directions. Despite the difference in propagating direction among the signal light 64, control light 70 and assist light 78, the function in the saturable absorption element 60 is absolutely the same as those of the saturable absorption elements 10 and 40 shown in FIG. 1 and FIG. 9, and the transmittance of the saturable absorption element 60 for the signal light 64 rapidly changes in response to changes in intensity of the control light 70 in the same manner as the embodiments shown in FIG. 1 and FIG. 9.

The signal light 64 passing through the saturable absorption element 60 is collected by a collective lens 84 onto an optical fiber 86, then propagates through the optical fiber 86, and exits to the exterior as output signal light 88.

In the embodiment shown here, since the control light 70 and the assist light 78 are introduced into the saturable absorption element 60 from directions avoiding interference with the signal light 64, an optical filter for extracting only the signal light component, such as the optical band pass filter 30 used in the embodiment shown in FIG. 1, need not be used.

Since the surface-emitting-type saturable absorption element 60 has the practically advantageous characteristics that its absorptance and gain characteristics do not depend on polarized conditions of the incident light, the embodiment is applicable more widely.

Figure 11:
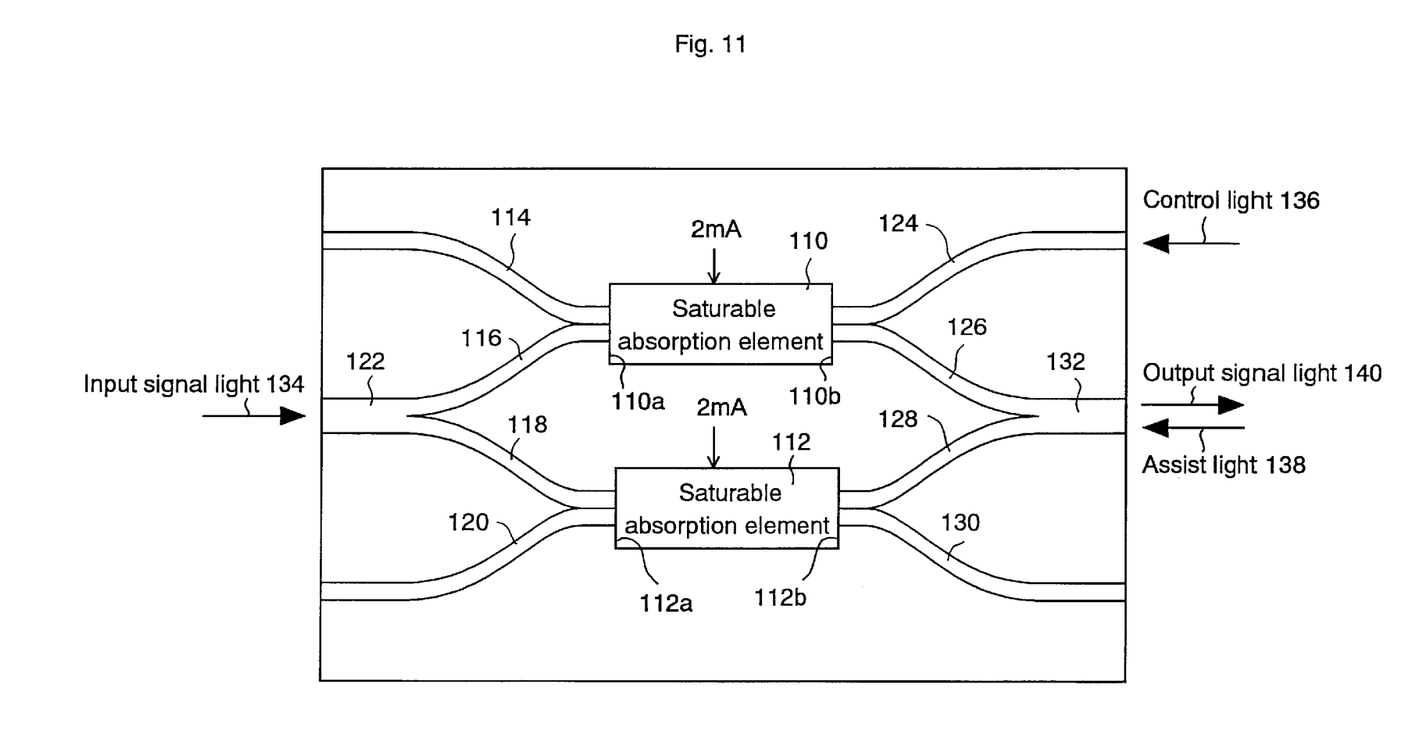
FIG. 11 is a schematic block diagram generally showing a fourth embodiment of the invention.

FIG. 11 is a schematic block diagram generally showing a fourth embodiment of the invention behaving as a Mach-Zehnder interferometer. Two waveguide-type semiconductor saturable absorption elements 110 and 112 are provided in parallel, and a DC current of 2 mA is applied to each of them. Connected to an end facet 110a of the semiconductor saturable absorption element 110 are semiconductor waveguides 114 and 116. Connected to an end facet 112a of the semiconductor saturable absorption element 112 are semiconductor waveguides 118 and 120. The semiconductor waveguides 116 and 118 couple to a common waveguide 122. That is, the semiconductor waveguides 116, 118 and 122 form a Y-shaped branch-coupled waveguide. Similarly for other end facets 110b and 112b of the semiconductor saturable absorption elements 110 and 112, semiconductor waveguides 124 and 126 are connected to the end facet 110b of the semiconductor saturable absorption element 110 whereas semiconductor waveguides 128 and 130 are connected to the end facet 112b of the semiconductor saturable absorption element 112. The semiconductor waveguides 126 and 128 merge a single waveguide 132.

Input signal light 134 is introduced into the semiconductor waveguide 122, and divided into two at the junction of the semiconductor waveguides 116 and 118. They propagate through the semiconductor waveguides 116, 118, respectively, and enter into the end facets 110a and 112a of the semiconductor saturable absorption elements 110 and 112. Control light 136 enters into the semiconductor waveguide 124, and then enters only into the end facet 110b of the semiconductor saturable absorption element 110. Assist light 138 is introduced into the semiconductor waveguide 132, and divided into two at the junction of the semiconductor waveguides 126 and 128. They respectively propagate through the semiconductor waveguides 126 and 128 and enter into the end surfaces 110b and 112b of the semiconductor saturable absorption elements 110 and 112. The semiconductor waveguides 114, 120 and 130 are not used in the embodiment shown here.

Divisional parts of the signal light 134 processed by the semiconductor saturable absorption elements 110 and 112 are introduced into the semiconductor waveguides 126 and 128 through the end facets 110b and 112b, and multiplexed at the junction with the semiconductor waveguide 132. The multiplexed light then propagates through the semiconductor waveguide 132, and is externally output as output signal light 140.

The input signal light 134, control light 136 and assist light 138 are the same as the input signal light 14, control light 16 and assist light 22 in the embodiment shown in FIG. 1, and also the semiconductor saturable absorption elements 110 and 112 have the same characteristics as those of the semiconductor saturable absorption element 10.

Explained below are behaviors of the instant embodiment. The input signal light 134 is divided into two and introduced to the semiconductor saturable absorption elements 110 and 112. The control light 136 enters into the semiconductor saturable absorption element 110 only. The assist light 140 is divided into two and introduced into the semiconductor saturable absorption elements 110 and 112.

When the control light 136 is OFF, two divisional parts of the signal light 134 pass through the symmetric waveguides. Therefore, they are multiplexed in the same phase, and the output signal light 140 becomes substantially the same as the input signal light 134.

In contrast, when the control light 136 is ON, the semiconductor saturable absorption element 110 behaves as explained with reference to FIG. 1, and the refractive index decreases as the carrier density increases due to absorption of the control light 136. As a result, there occurs a difference in phase between two divisional parts of the signal light in two optical paths. When the phase difference becomes $\pi$ (inversion), the signal light resulting from multiplexing divisional parts from the semiconductor saturable absorption elements 110 and 112 becomes OFF.

When the control light 136 is again turned OFF, the refractive index of the semiconductor saturable absorption element 110 relative to the signal light 134 quickly returns to the normal value due to a decrease of the carrier lifetime caused by stimulated emission of the assist light 140. It is the same as the behavior of the embodiment shown in FIG. 1.

In this manner, by using the Mach-Zehnder interferometer circuit, a quick and fast-cyclic all optical gate switch can be realized.

The foregoing embodiments have been explained as using a typical multi-quantum well structure as the absorption layer of the saturable absorption elements 10, 60, 110 or 112, the invention can use any kind of saturable absorption element, not depending on the structure of the saturable absorption element. For example, the invention may use a saturable absorption element in which the absorption layer has a multi-quantum well structure made by stacking well layers alternately different in thickness, or a saturable absorption element in which the absorption layer has a low-dimensional quantum well structure such as a quantum well structure, a quantum wire and a quantum box.

Although the embodiments shown above have been used an InGaAsP semiconductor in the band for 1.5 $\mu$m as the material of the semiconductor saturable absorption elements 10, 60, 110 and 112, III–V semiconductor or II–VI semiconductors may be used. These semiconductor materials may be either lattice-matched materials or lattice-mismatched materials.

Also from the viewpoint of optical signal wavelengths, the invention is applicable with any desired wavelength band these semiconductors can absorb and amplify, in addition to the 0.8 $\mu$m band, 1.3 $\mu$m band and 1.5 $\mu$m band widely used currently for optical transmission, optical exchange, etc.

It is important that the signal light has a wavelength sufficiently absorbed in a gain spectrum realized by injection of a current into the semiconductor satiable absorption element. As to the assist light, when it has the transparent wavelength (a wavelength making the gain and the loss be zero) in the gain spectrum realized by injection of a current into the semiconductor saturable absorption element, useless absorption or amplification does not occur. However, this is not indispensable, but it is sufficient for the wavelength to be longer than that of the input signal light and shorter than the wavelength of the band-gap energy.

Intensity of the assist light and the carrier lifetime have a trade-off relationship. Therefore, by increasing the intensity of the assist light, any desired carrier lifetime can be realized. Additionally, as understood from the embodiments shown in FIGS. 9, 10 and 11, the assist light can be introduced into the semiconductor saturable absorption element independently from the signal light, and may be introduced from an angled direction or lateral direction relative to the semiconductor saturable absorption element.

As explained before, gating of a signal pulse train and coding of CW signal light result in realizing different functions. However, the principle of behaviors (physical condition) is common to both schemes. Therefore, the fact that the embodiments shown in FIGS. 9, 10 and 11 can realize an optical gate switch function means that also the waveform converting function and the optical modulating function can be realized.

It will be readily understood from the foregoing explanation that the invention can significantly reduce the time required for a saturable absorption element to recover its original absorptance after it is saturated in absorptance. For example, the time can be reduced from approximately one nanosecond of a conventional device to several tens of picosecond or less which is much shorter than a typical carrier lifetime. Moreover, heat is not generated therefor. As a result, an optical gate device, etc. for quick and fast-cyclic behaviors can be realized.

What is claimed is:

1. An optical processor comprising:

a semiconductor saturable absorber;

a current source for injecting current into the semiconductor saturable absorber;

a signal light introducer for introducing signal light having a wavelength into the semiconductor saturable absorber;

a control light introducer for introducing control light having a wavelength not longer than the wavelength of the signal light into the semiconductor saturable absorber;

an assist light introducer for introducing assist light having a wavelength longer than the wavelength of the signal light into the semiconductor saturable absorber; and a signal light extractor for extracting the signal light from the semiconductor saturable absorber.

2. The optical processor according to claim 1 wherein the wavelength of the signal light is within an absorption wavelength band of the semiconductor saturable absorber when the current is injected therein.

3. The optical processor according to claim 1 wherein the assist light comprises a continuous wave.

4. The optical processor according to claim 1 wherein the assist light comprises a single-wavelength light.

5. The optical processor according to claim 4 wherein the wavelength light of the assist light is a transparent wavelength of the semiconductor saturable absorber when the current is injected therein.

6. The optical processor according to claim 1 further comprising a multiplexer for multiplexing the signal lights before being introduced into the semiconductor saturable absorber, with the control light and the assist light.

7. The optical processor according to claim 1 further comprising a multiplexer for multiplexing the control light and the assist light, and an optical coupler for introducing output light from the multiplexer into the semiconductor saturable absorber from a direction opposite from a direction, of the signal light and for supplying the signal light from the semiconductor saturable absorber to the signal light extractor.

8. The optical processor according to claim 1 wherein the semiconductor saturable absorber comprises a waveguide-type element.

9. The optical processor according to claim 1 wherein the semiconductor saturable absorber comprises a surface-emitting-type element.

10. An optical processor comprising:
   first and second semiconductor saturable absorbers each being adapted to receive DC current and assist light having a wavelength;
   a signal light guide for dividing input signal light into two divisional parts and for applying the divisional parts to the first and second semiconductor saturable absorbers, respectively, said input signal light having a wavelength shorter than the wavelength of the assist light;
   a multiplexer for multiplexing and outputting the divisional parts of signal light output from the first and second semiconductor saturable absorbers, respectively; and
   a control light introducer for introducing a control light having a wavelength not longer than the wavelength of the input signal light into the first semiconductor saturable absorber.

11. The optical processor according to claim 10 wherein the assist light propagates through the multiplexer in a direction opposite from a direction of the divisional parts from the first and second semiconductor saturable absorbers and enters into the first and second semiconductor saturable absorbers.

12. The optical processor according to claim 10 wherein the wavelength of the input signal light is with an absorption wavelength band of each of the semiconductor saturable absorbers when the DC current is respectively applied to each of said semiconductor saturable absorbers.

13. The optical processor according to claim 10 wherein the assist light comprises a continuous wave.

14. The optical processor according to claim 10 wherein the assist light comprises a single-wavelength light.

15. The optical processor according to claim 14 wherein the wavelength of the assist light is a transparent wavelength of each of the semiconductor saturable absorbers when the DC current is respectively applied to each of said semiconductor saturable absorbers.

16. The optical processor according to claim 10 wherein the semiconductor saturable absorber comprise waveguide-type elements.

* * * * *